(12) United States Patent
Mauer (10) Patent No.: US 9,675,061 B2
(45) Date of Patent: Jun. 13, 2017

(54) PORTABLE BACKPACK FEEDER APPARATUS

(71) Applicant: James Mauer, Racine, WI (US)

(72) Inventor: James Mauer, Racine, WI (US)

(*) Notice: Subject to any disclaimer, the term of this patent is extended or adjusted under 35 U.S.C. 154(b) by 82 days.

(21) Appl. No.: 14/026,623

(22) Filed: Sep. 13, 2013

(65) Prior Publication Data

US 2015/0076257 A1 Mar. 19, 2015

(51) Int. Cl.
*A01M 31/00* (2006.01)
*B05B 7/14* (2006.01)
*A01C 7/02* (2006.01)
*A01K 5/00* (2006.01)

(52) U.S. Cl.
CPC .............. *A01M 31/008* (2013.01); *A01C 7/02* (2013.01); *A01K 5/00* (2013.01); *B05B 7/1427* (2013.01)

(58) Field of Classification Search
CPC ......... B05B 7/1427; A01C 15/02; A01C 7/02; A01M 31/008; A01K 5/00; A01K 5/0225
USPC ....... 239/152, 154, 328, 379, 652, 653, 668, 239/689; 222/175; 224/576, 148.2, 153, 224/250, 257, 258, 607, 608, 613–622; 119/51.01–69; 383/16, 36, 121, 906
See application file for complete search history.

(56) References Cited

U.S. PATENT DOCUMENTS

| | | | |
|---|---|---|---|
| 216,423 A * | 6/1879 | Lewis | 222/175 |
| 260,373 A | 7/1882 | Erwin | |
| 967,096 A | 8/1910 | Wood | |
| 1,469,118 A * | 9/1923 | Speicher | 239/652 |
| 1,524,585 A | 1/1925 | Shutterly | |
| 1,793,197 A | 2/1931 | Speicher | |
| 2,549,233 A * | 4/1951 | Phillips | 222/145.4 |
| 2,599,118 A | 6/1952 | McMillan | |
| 3,603,482 A | 9/1971 | Shelton | |
| 5,339,994 A | 8/1994 | Nuila | |
| 5,503,090 A * | 4/1996 | Guzan | A01G 29/00 111/7.2 |
| 6,089,477 A | 7/2000 | Dillon | |
| 6,427,779 B1 | 8/2002 | Richman | |
| 6,729,558 B1 | 5/2004 | Seenauth | |
| 7,070,077 B2 * | 7/2006 | Egart | A45F 3/02 224/608 |
| 7,832,663 B1 * | 11/2010 | Cotham | 239/653 |
| 7,837,076 B2 | 11/2010 | Welker et al. | |
| 8,066,206 B1 * | 11/2011 | Cotham | 239/653 |
| 2004/0031864 A1 | 2/2004 | Johnston | |
| 2006/0207513 A1 * | 9/2006 | Carroll | 119/57.91 |
| 2008/0173685 A1 * | 7/2008 | Welker et al. | 224/576 |
| 2010/0327087 A1 * | 12/2010 | Harris | 239/653 |

* cited by examiner

*Primary Examiner* — Arthur O Hall
*Assistant Examiner* — Cody Lieuwen
(74) *Attorney, Agent, or Firm* — Jansson Munger McKinley & Kirby Ltd.

(57) ABSTRACT

A portable backpack feeder apparatus including a granular-material container having a filling opening and a gravity-flow opening and flow sleeve extending from the gravity-flow opening of the container to an outflow opening, the flow sleeve being flexible along its length for manual flow control and for positioning and aiming the outflow opening.

7 Claims, 7 Drawing Sheets

PORTABLE BACKPACK FEEDER APPARATUS

FIELD OF THE INVENTION

The present invention relates to apparatus for depositing game-attracting granular feeds at selected locations of hunting grounds.

BACKGROUND OF THE INVENTION

Hunters have long engaged in the practice of depositing game-attracting granular feeds, such as small piles of dried corn kernels, at selected locations of hunting grounds for the purpose of increasing the likelihood of finding game. When making such deposits, particularly when making many deposits of granular feeds at widely-spread locations in large geographical areas, the task of carrying and accurately depositing appropriate amounts of granular feeds is arduous, time-consuming and tiring.

In dealing with these problems, a variety of devices have been developed, some of which have become the subject of patents. One class of such equipment is portable backpack feeder devices which each include (a) a granular-material container having a filling opening and a gravity-flow opening and (b) a carrying strap secured to the container and configured to extend over a user's shoulder. Such apparatus have various devices for dispensing granular materials from their granular-material containers to the intended locations.

Examples of prior art devices for such wild-game-related purposes or similar purposes include those disclosed in U.S. Pat. No. 7,837,076 (Welker et al.), U.S. Pat. No. 7,832,663 (Cotham) and U.S. Pat. No. 8,066,206 (Cotham), as well as a product known as "The Action Back Feeder/Seeder" currently being sold by Gander Mountain, which appears to be based on a Cotham disclosure.

Certain of such prior art devices, however, have various shortcomings and/or problems that make them less than fully satisfactory for their intended purposes. For example, some of such devices have mechanical dispensing means with various interacting mechanical parts which can be problematic and provide only limited flow control, particularly when it comes to quantity and speed of dispensing. Also, operation of such prior art dispensing apparatus may not be particularly quiet, but instead cause noises which are not desirable in wild-game-related situations. Likewise, if lubrication of dispensing parts and constructions is required, related scent may be undesirable with respect to deposited granular feed materials.

Other disadvantages of certain prior art devices relate to form of the apparatus, including particularly the container portions themselves. More specifically, such devices, which by their nature are committed to the particular purpose, namely, granular-material dispensing, tend to be of fixed shape and rather bulky—and not readily available for other carrying-related uses. Such apparatus of the prior art tends to be fairly complex in structure and, therefore, somewhat costly to manufacture.

In short, there is a need for improved portable backpack feeder apparatus, and it is to this need that the present invention is addressed.

OBJECTS OF THE INVENTION

It is an object of the invention to provide an improved portable backpack feeder apparatus overcoming some of the problems and shortcomings of the prior art, including those referred to above.

Another object of the invention is to provide a portable backpack feeder apparatus which, in its dispensing device, does not have interacting mechanical parts or the problems related thereto.

Another object of the invention is to provide a portable backpack feeder apparatus which, although of simple construction, has substantial flow control of dispensing, both as to the quantity of granular material being dispensed and the speed of dispensing.

Still another object of the invention is to provide a portable backpack feeder apparatus which is exceptionally quiet in operation.

Yet another object of the invention is to provide a portable backpack feeder apparatus which does not require lubrication or other maintenance.

Another object of the invention is to provide a portable feeder apparatus which is adaptable for selective depositing various granular materials for various purposes.

Another object of the invention is to provide a portable backpack feeder apparatus which is not bulky and so may be transported, carried and stored without taking much space.

Another object of the invention is to provide a portable backpack feeder apparatus which, when not being used for depositing granular materials, can readily be used for other carrying-related purposes, such as by hunters and campers.

Another object of the invention is to provide a portable backpack feeder apparatus of particularly simple construction, which therefore is fairly inexpensive to manufacture.

How these and other objects are accomplished will become apparent from the following descriptions and the drawings.

SUMMARY OF THE INVENTION

This invention is an improved portable backpack feeder apparatus for carrying a quantity of dried corn kernels or other granular feed to remote hunting locations or the like and to deposit desired amounts of such granular feed in intended locations.

The improved apparatus is a portable backpack feeder of the type including (a) a granular-material container having a filling opening and a gravity-flow opening and (b) a carrying strap secured to the container and configured to extend over a user's shoulder. The improvement includes a flow sleeve having proximal and distal ends, the proximal end being secured to the granular-material container around the gravity-flow opening thereof and the distal end forming an outflow opening. The flow sleeve is flexible therealong for manual flow control and for positioning and aiming the outflow opening. A user, while carrying a supply of dried corn kernels or other granular feed, can easily and fully control the direction and amount of flow of such material from the container by using his hands to manipulate the sleeve.

In highly preferred embodiments, the flow sleeve is of sufficient length such that the distal outflow opening thereof can be moved to a raised non-flow position. At such raised position, the distal end of the flow sleeve is preferably removably attachable to a portion of the carrier strap at a position along the front of the user's body. This allows the user to walk along hands-free while wearing the backpack feeder apparatus as he goes from one location to another where the dried corn kernels or other granular feed are to be deposited.

In preferred embodiments, the flow sleeve is configured such that the distance around the outflow opening at the distal end of the sleeve is less than the distance around the gravity-flow opening of the granular-material container. In other words, the size of the outflow opening is smaller than the opening which allows granular material to flow into the sleeve. In highly preferred embodiments, the flow sleeve is tapered—preferably gradually tapered—to a reduced cross-dimension at the outflow opening.

The container in which the granular material is carried has an upper end and a lower end, and it is preferred that the gravity-flow opening be positioned at the lower end, in order to facilitate flow upon dispensing. This avoids any need, or significant need, to manipulate the container portion of the apparatus to facilitate outflow of granular material. To facilitate filling of the container portion of the apparatus, it is preferred that the filling opening be positioned at the upper end of the container. The filling opening is preferably reclosable and extends across the majority of the width of the container, which facilitates rapid filling. The reclosable opening preferably is a zippered opening.

In highly preferred embodiments, the container is of flexible bag material which at least partially conforms to the amount of the granular material therewithin. The flexible material is preferably a flexible textile material, and the flexible sleeve itself is of a flexible textile material. Indeed, it is highly preferred that the container and sleeve be integrally formed of such flexible textile material. In this connection, it is to be understood that the precise location of the gravity-flow opening of the container may not be apparent when the sleeve and container are integrally formed; nonetheless, it will be understood that the container does define a gravity-flow opening that feeds the sleeve.

In preferred embodiments, the container has an upper surface the topmost portion of which is attached to the strap in position to be near a user's shoulder on one of the user's right and left sides, and the upper surface of the container is configured to extend downwardly across the user's back toward the other of the user's right and left sides, with the gravity-flow opening being near the other of the user's right and left sides. The flow sleeve is preferably positioned and configured to extend around the other of the user's left and right sides to the user's front. This arrangement facilitates easy use of the device of this invention.

In certain of such embodiments, the strap includes an over-shoulder portion, a down-the-front portion, and a clasp between such portions removably joining the over-shoulder portion to the down-the-front portion of the strap. This facilitates placement and removal of the backpack feeder apparatus with respect to a user's body. And, with the distal end of the flow sleeve removably attached to the strap in position on the user's front, detaching it to begin dispensing is particularly easy.

Highly preferred embodiments include a closing device to draw the flexible sleeve together thereby to shut off the flow of the granular material through the sleeve. Such closing device may include a drawstring around the flexible sleeve, preferably at the distal end of the sleeve.

In certain preferred embodiments, the flow sleeve and the outflow opening are of sufficient size to allow a mixed flow of apples and hardened corn kernels.

Another aspect of this invention is an improved portable feeder apparatus of the type including a granular-material container having a filling opening and a gravity-flow opening, in which a flow sleeve extends from a proximal sleeve end which is secured around the gravity-flow opening to a distal sleeve end forming an outflow opening, the flow sleeve being flexible therealong for manual flow control and for positioning and aiming the outflow opening.

The term "sleeve" is used for an important element of this invention, namely, the flow sleeve, not because such element is necessarily sleeved over something, although it is sleeved over a portion of the supply of corn kernels or other granular feed, but because the element may be said to have the appearance and flexibility of the sleeve of a shirt.

DETAILED DESCRIPTION OF PREFERRED EMBODIMENTS

The figures illustrate portable backpack feeder 10 of this invention. Backpack feeder 10 includes a granular-material container 12 having a filling opening at 12A and a flow sleeve 14 below and an internal communication with container 12. Container 12 is of flexible bag material, such as a flexible nylon or canvas, and generally conforms to the amount of the granular material in the container. Flow sleeve 14 is integrally formed with container 12; that is, container 12 and flow sleeve 14 are of the same flexible textile material.

Figure 4:
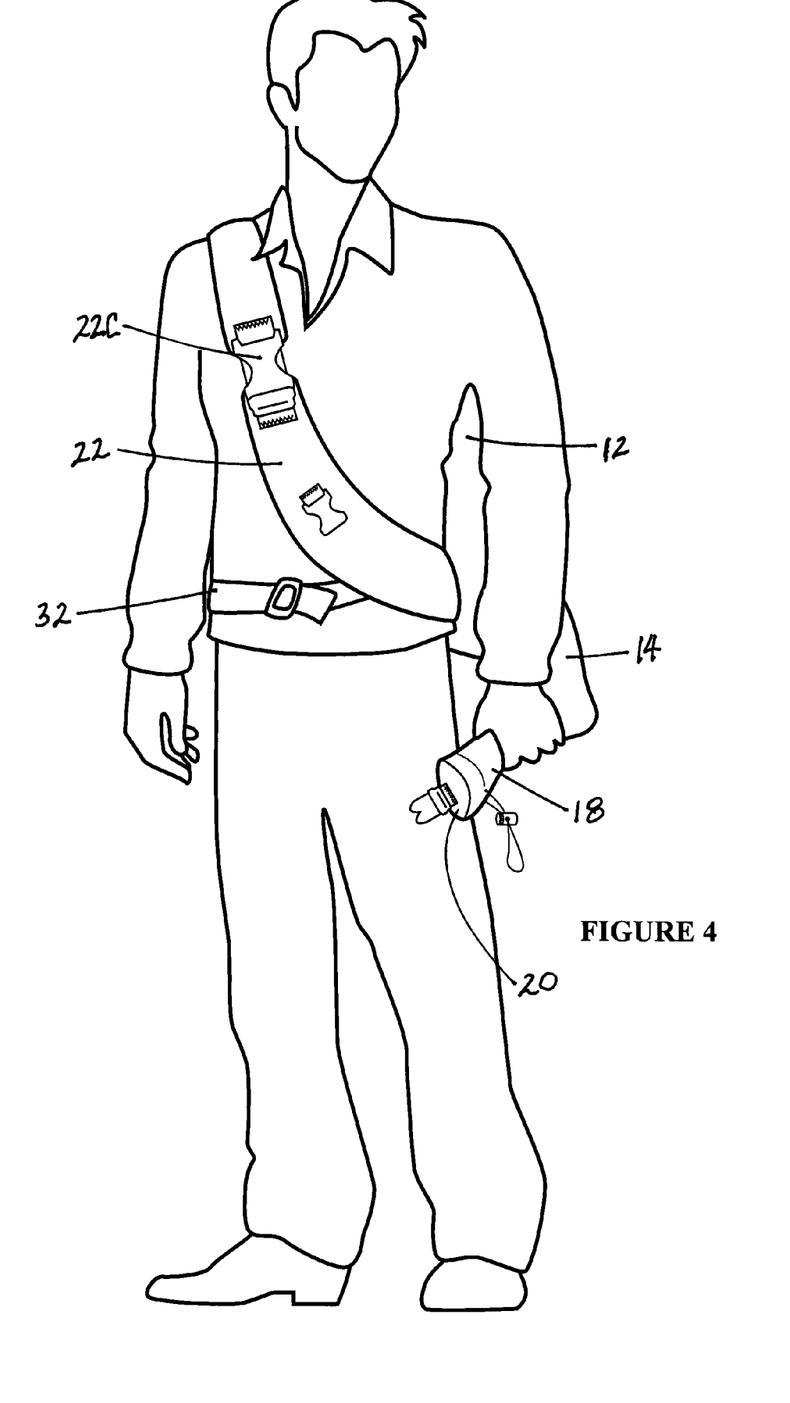
FIG. 4 is a similar front view, but with the apparatus in dispensing orientation and the user restraining flow of granular material from the container by means of the grip of his left hand.

In addition to its filling opening at 12A, container 12 has a gravity-flow opening at the lower end thereof, namely, at 12B. Flow sleeve 14 has a proximal end 16 and a distal end 18. Proximal end 16 is secured to the lower end 12C of granular-material container 12 around the container's gravity-flow opening at 12B, such that the inside of flow sleeve 14 is in full flow communication with the inside of container 12. Distal end 18 forms an outflow opening 20, and flow sleeve 14 is readily movable to direct the flow of granular material being dispensed through outflow opening 20. And, as noted, flow sleeve 14 is flexible along its length to facilitate manual flow control by the user. Such flow control can be stopping flow altogether by squeezing flow sleeve 14 as shown in FIG. 4, or controlling the amount of flow in the same way.

As can be seen in the drawings, flow sleeve 14 is gradually tapered from a larger cross-dimension at proximal end 16 to a reduced cross-dimension at distal end 18. The perimetrical distance around outflow opening 20 is considerably less than the perimetrical distance around the container's gravity-flow opening at 12B, making the size of outflow opening 20 smaller than the opening which allows granular material to flow into flow sleeve 14. While outflow opening 20 can be designed in different sizes, its size is chosen to facilitate the outflow of the granular material. Given the manual control of flow which this invention provides, the size of outflow opening 20 can be larger than is needed for flow of most granular materials to be dispensed. Indeed, the size of flow sleeve 14 and outflow opening 20 can be of sufficient size to allow a mixed flow of apples and hardened corn kernels.

Figure 5:
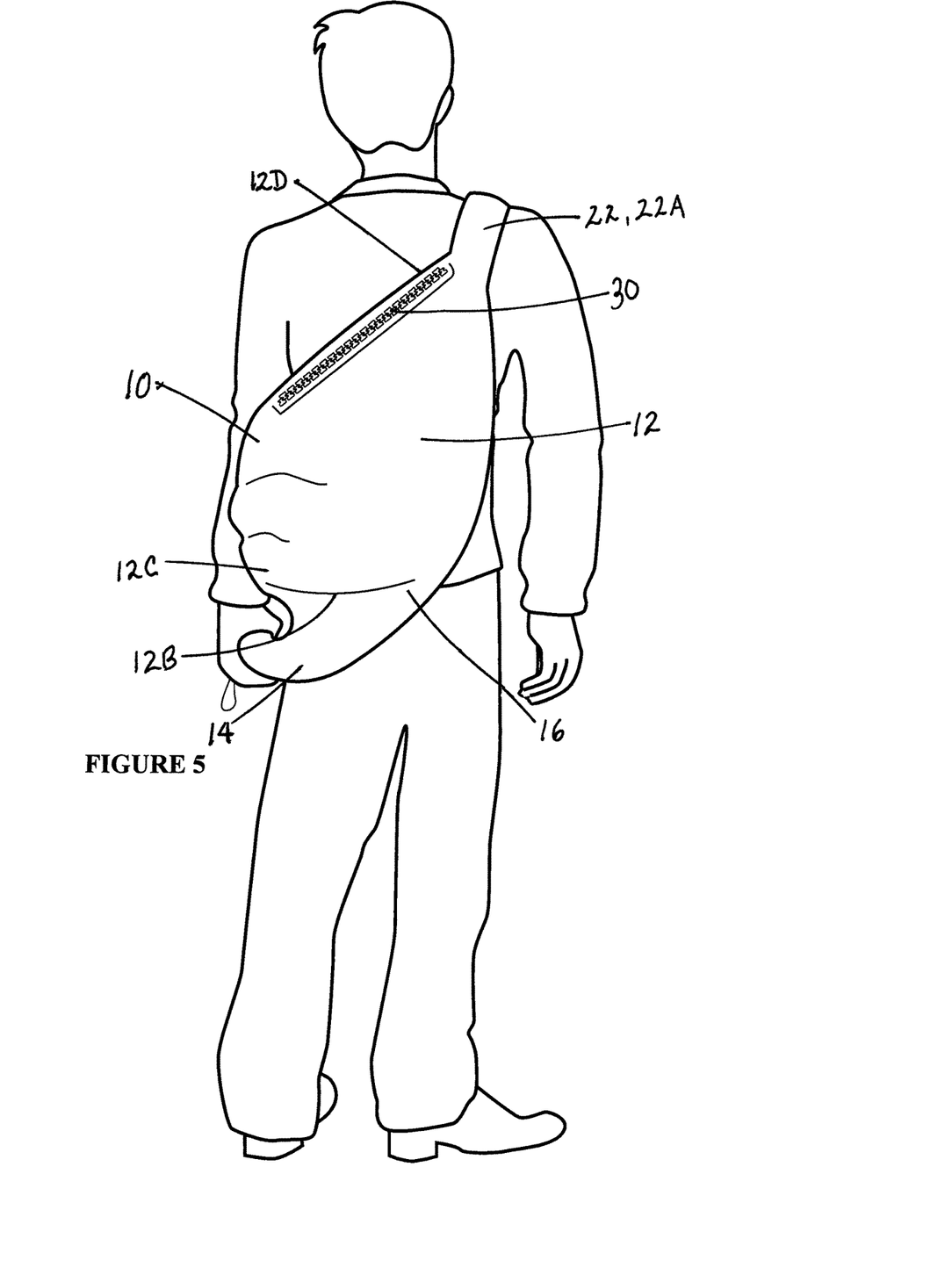
FIG. 5 is rear view of FIG. 4, illustrating other portions of the apparatus.
Figure 6:
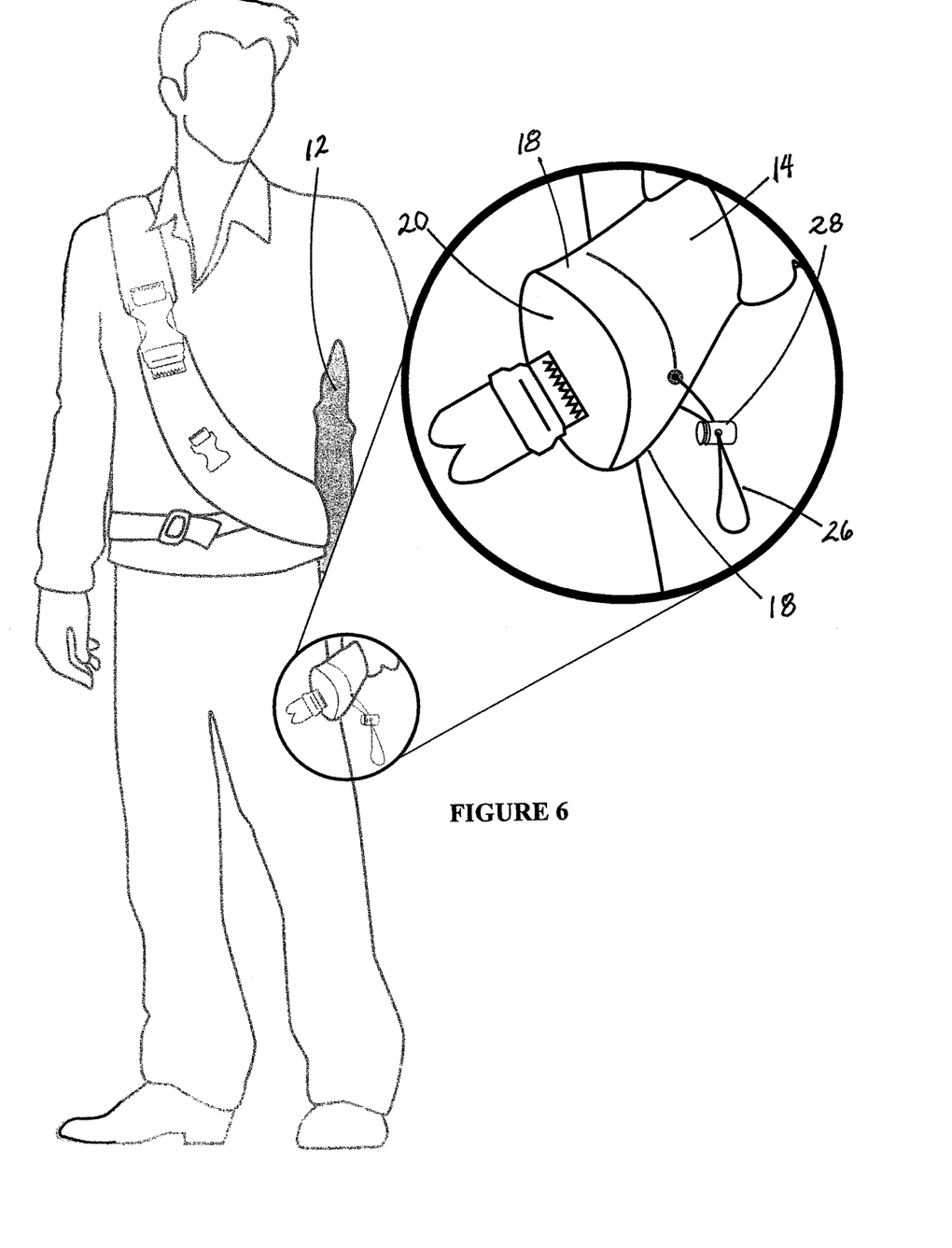
FIG. 6 is identical to FIG. 4, but showing a close-up of the end of the flow sleeve.

It can also be observed from the drawings, particularly from FIG. 5, that container 12, while having considerable capacity to hold granular corn kernels or other granular material, is also configured in a generally funnel-like shape designed to facilitate the flow of granular material into flow sleeve 14. This configurational limits or avoids any need for manipulation of container 12 to obtain full outflow of the granular material.

Portable backpack feeder 10 also includes a carrying strap 22 which, as shown best in FIG. 5, is secured at one end to the upper end 12D of container 12 and, as shown in several of the drawing figures, extends from that point over the user's shoulder, down the front of the user's torso, and back around the user's torso, on the side of the user opposite the side of the shoulder over which strap extends, to container 12, where strap 22 is attached at a second end thereof (not shown) to container 12. Carrying strap 22 includes two main portions which, when feeder apparatus 10 is being carried by a user, are removably joined to one another. These two main strap portions include an over-shoulder portion 22A and a down-the-front portion 22B; and carrying strap 22 also includes a clasp 22C between such portions removably joining over-shoulder portion 22A to down-the-front portion 22B. This facilitates placement and removal of backpack feeder apparatus 10 with respect to a user's body.

Figure 1:
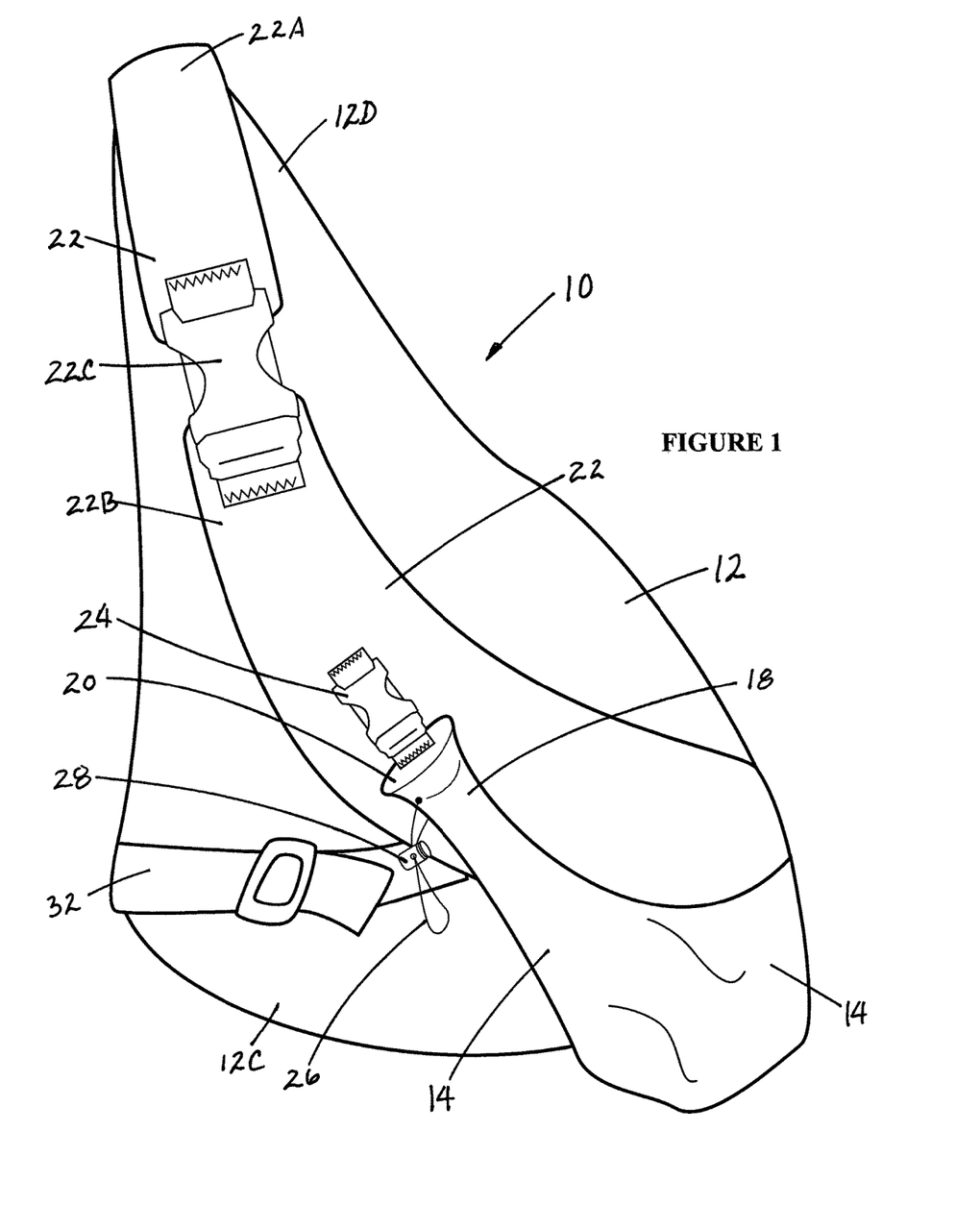
FIG. 1 is a front perspective view of the portable backpack feeder apparatus of this invention in an orientation as worn by a user when not dispensing.
Figure 2:
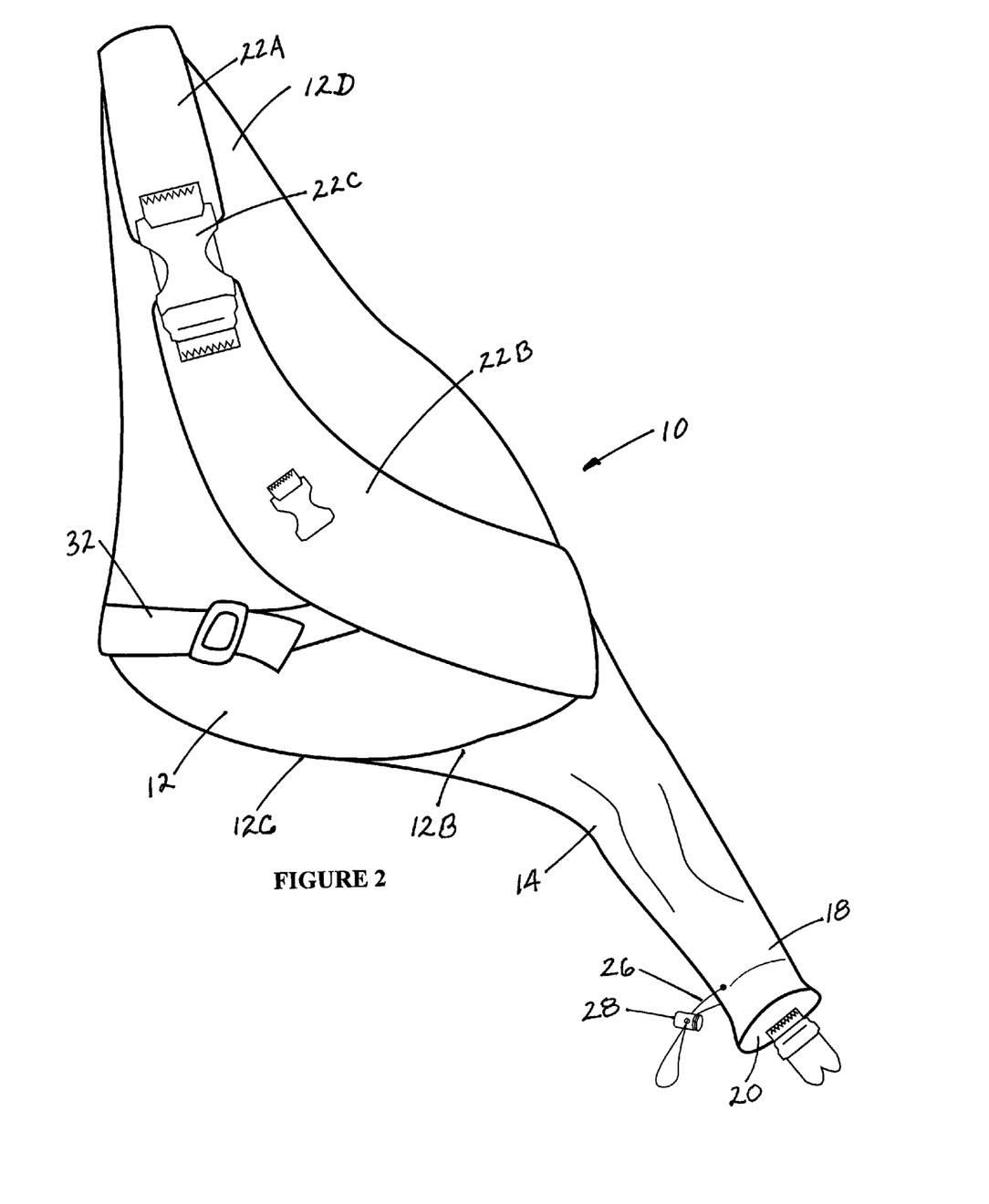
FIG. 2 is another front perspective view but with the flow sleeve in a dangling position.
Figure 3:
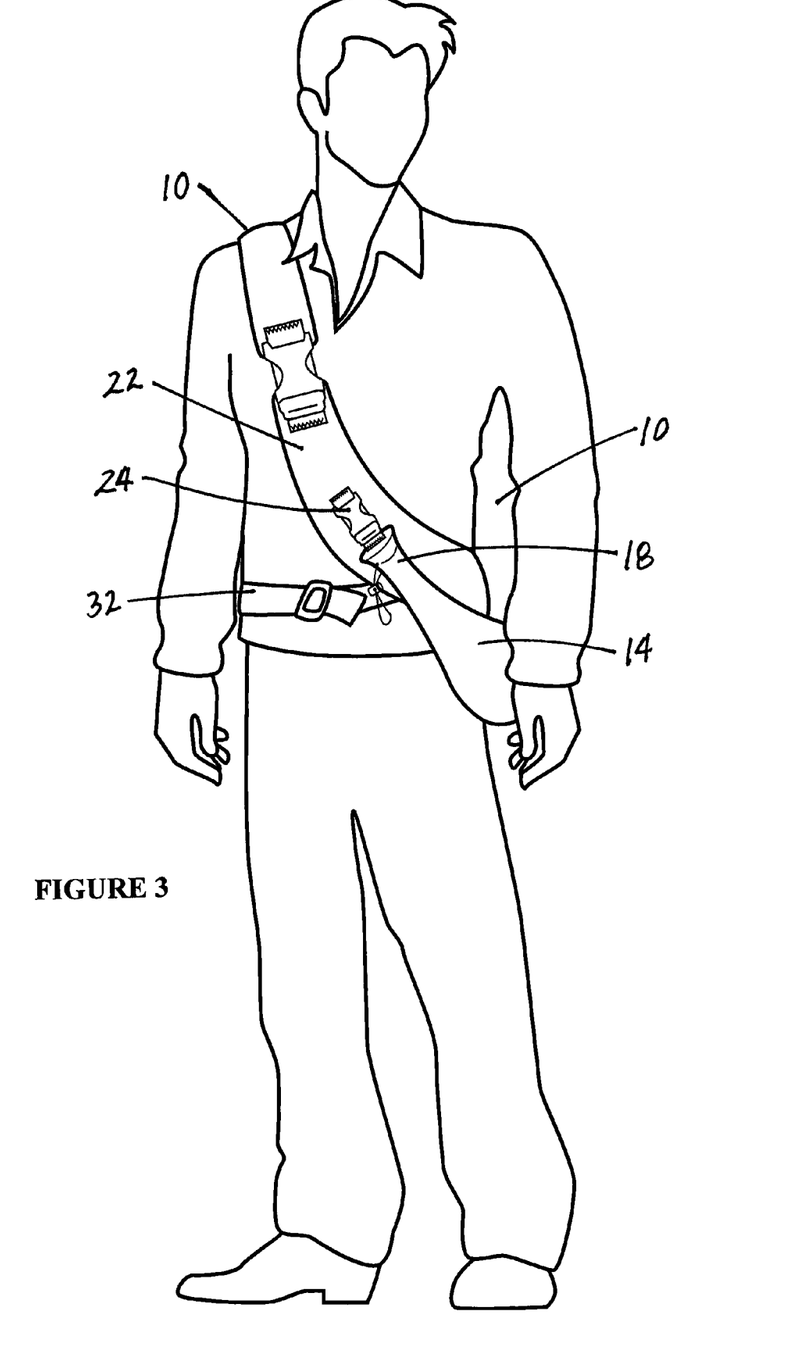
FIG. 3 is a view from the front of a user wearing the apparatus in non-dispensing orientation.
Figure 7:
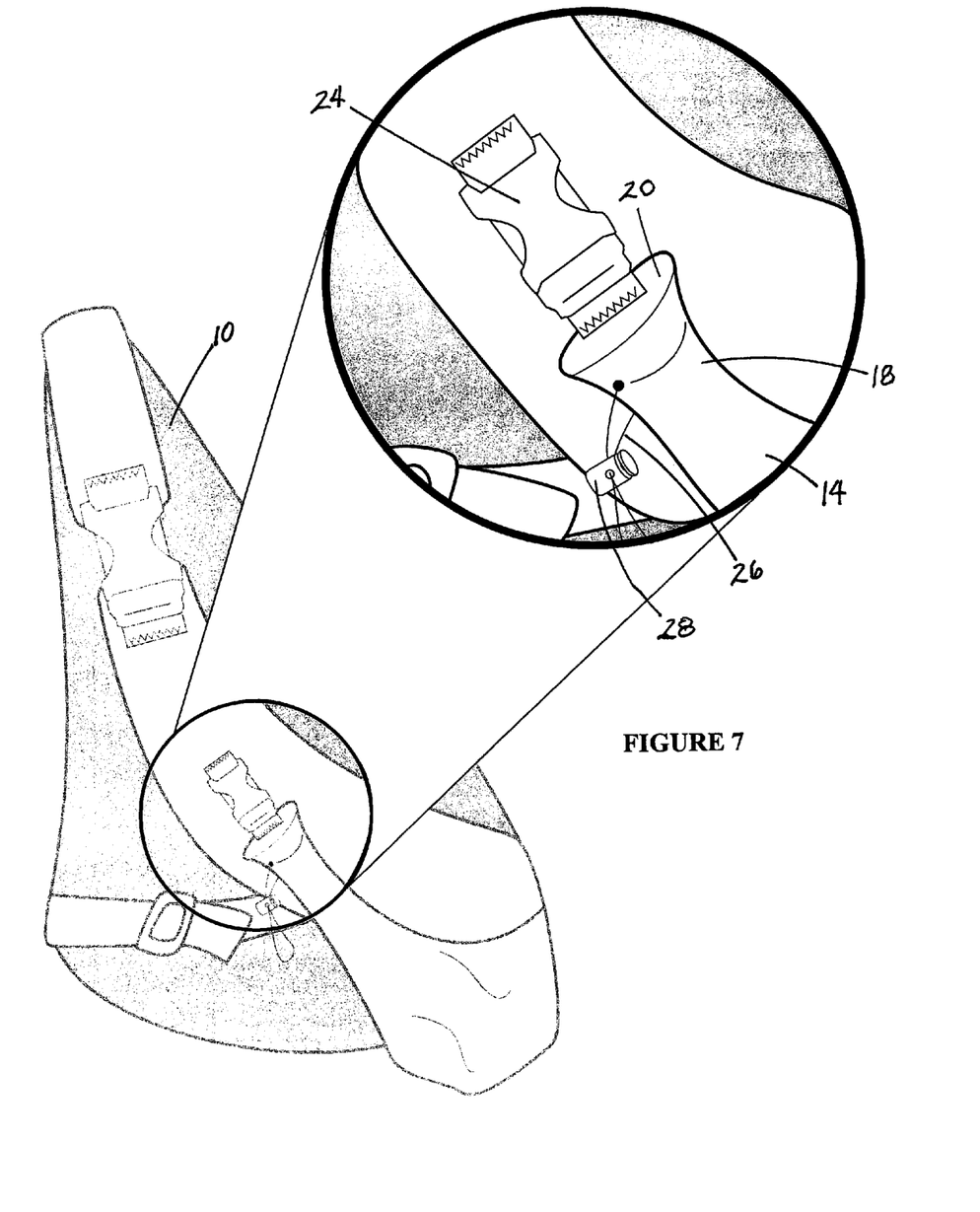
FIG. 7 is substantially identical to FIG. 3, but shows a close-up of the engagement of the end of the flow sleeve in its non-use position.

Distal end 18 of flow sleeve 14 can be described as a free end of the flow sleeve. Flow sleeve 14 is long enough such that distal outflow opening 20 can be moved to a raised non-flow position, as is illustrated in FIGS. 1, 3 and 7. At such raised position, distal end 18 of flow sleeve 14 is removably attachable to down-the-front portion 22B of carrying strap 22. Such movable attachment is by means of a clasp 24. This allows easy detachment and attachment of flow sleeve 14, so that dispensing can stop and start quickly.

Referring again to the size of outflow opening 20 at distal end 18, a shut-off device in the form of drawstring device 26 extends around flow sleeve 14 at distal end 18. This allows adjustment of the size of outflow opening 20, and complete closing of outflow opening 20. Drawstring device 26 includes a friction stop 28 which, once the drawstring is drawn tight about flow sleeve 14, keeps outflow opening 20 closed. Likewise, once the drawstring is drawn to appropriately reduce outflow opening 20 to a desired size, friction stop 28 will maintain the desired opening size.

Clasps 22C and 18 are of any of wider variety of well-known types; acceptable choices, particularly quick-connect/disconnect clasps, would readily be apparent to those skilled in the art of backpacks and the like.

A zipper 30 is at filling opening 12, and this facilitates the opening and closing of a wide filling opening. A wide variety of other easy closing devices, including Velcro-type closures, are possible at filling opening 12.

As shown at least in FIGS. 1-4, portable backpack feeder 10 includes an around-waist belt 32 secured to the front of the lower portion of container 12 in position to be wrapped around the waist of the user. This serves to further stabilize the position of the backpack feeder on the user.

While the backpack feeder apparatus of this invention is illustrated herein with a single shoulder strap, use of a two-strap backpack arrangement is also satisfactory. A wide variety of alternatives are possible.

While the principles of the invention have been shown and described in connection with specific embodiments, it is to be understood that such embodiments are by way of example and are not limiting.

The invention claimed is:

1. A frameless portable backpack feeder apparatus for making game-attracting granular-feed deposits comprising:
   a granular-material container having an upper surface which (a) includes a topmost upper-surface portion configured for positioning at only one of a user's shoulders on only one of the user's right or left sides and (b) extends from the topmost upper-surface portion downwardly and laterally such that the upper surface is configured to extend across the user's back toward the other of the user's right and left sides where the upper surface ends, the container also having a filling opening positioned at the upper surface of the container and extending across the majority of the width of the container and including an elongate closure along the majority of the width of the container, a lower end, and a gravity-flow opening at the lower end, the gravity-flow opening configured for positioning near the other of the user's right and left sides;
   a one-shoulder sole carrying strap secured at one end to, and extending from, the topmost portion of the upper surface of the container and configured to extend over the one shoulder of the user, down the front of the user's torso, and back around the user's torso on the other of the user's right and left sides and secured at its other end to the lower end of the container, the strap having a down-the-front portion having a sleeve-holding clasp thereon;
   a flow sleeve having a proximal sleeve end secured around the gravity-flow opening and extending to a distal sleeve end which forms an outflow opening, the flow sleeve being of material such that it is squeezably flexible along the entire length thereof for manual flow control and for positioning and aiming the outflow opening, the flow sleeve being tapered to a reduced cross-dimension at the outflow opening and being positioned and configured and of sufficient length to extend around the other of the user's right and left sides to the user's front in position either (a) to be operated by squeezing along the length thereof by the user's hand on that side for flow control when the flow sleeve and its distal end are in a lowered position or (b) to be removably held in a raised non-flow position extending upwardly along the down-the-front portion of the strap with the distal end attached thereto by the sleeve-holding clasp between the distal end and the strap, the flow sleeve and the granular-material container being integrally formed and of the same flexible textile material; and
   a closing device at the flexible sleeve distal end configured to draw the flexible sleeve together thereby to maintain a shut-off of the flow of the granular material through the sleeve.

2. The portable backpack feeder apparatus of claim 1 wherein the flow sleeve is configured such that the distance around the outflow opening is less than the distance around the gravity-flow opening, such that the size of the outflow opening at the distal end of the flow sleeve is smaller than the size of the gravity-flow opening at the proximal end of the flow sleeve.

3. The portable backpack feeder apparatus of claim 1 wherein the elongate closure is a zipper.

4. The portable backpack feeder apparatus of claim 1 wherein the flexible textile material forming the container at least partially conforms to the amount of the granular material within the container.

5. The portable backpack feeder apparatus of claim 1 wherein the strap includes:
   an over-shoulder portion; and
   a clasp between the over-shoulder and down-the-front portions removably joining the over-shoulder portion to the down-the-front portion of the strap,
thereby facilitating placement and removal of the backpack feeder apparatus with respect to a user's body.

6. The portable backpack feeder apparatus of claim 1 wherein the closing device includes a drawstring around the flexible sleeve.

7. The portable backpack feeder apparatus of claim 2 wherein the flow sleeve and the outflow opening are of sufficient size to allow a mixed flow of apples and hardened corn kernels.

* * * * *